United States Patent
Das et al.

(10) Patent No.: US 8,938,355 B2
(45) Date of Patent: Jan. 20, 2015

(54) HUMAN ASSISTED TECHNIQUES FOR PROVIDING LOCAL MAPS AND LOCATION-SPECIFIC ANNOTATED DATA

(75) Inventors: Saumitra Mohan Das, San Jose, CA (US); Edward Thomas Lingham Hardie, Menlo Park, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 12/686,267

(22) Filed: Jan. 12, 2010

(65) Prior Publication Data

US 2010/0235091 A1 Sep. 16, 2010

Related U.S. Application Data

(60) Provisional application No. 61/160,208, filed on Mar. 13, 2009.

(51) Int. Cl.
*H04W 4/02* (2009.01)
*G01C 21/36* (2006.01)
*H04L 29/08* (2006.01)

(52) U.S. Cl.
CPC ............ *G01C 21/3602* (2013.01); *H04W 4/02* (2013.01); *H04L 67/12* (2013.01); *H04L 67/18* (2013.01)
USPC ........................................................ 701/408

(58) Field of Classification Search
None
See application file for complete search history.

(56) References Cited

U.S. PATENT DOCUMENTS

| | | | |
|---|---|---|---|
| 6,215,441 B1 * | 4/2001 | Moeglein et al. | 342/357.25 |
| 6,282,426 B1 | 8/2001 | Wang | |
| 6,295,502 B1 | 9/2001 | Hancock et al. | |
| 6,456,239 B1 | 9/2002 | Werb et al. | |
| 6,473,523 B1 | 10/2002 | Newman et al. | |
| 6,493,766 B1 | 12/2002 | Buchholz et al. | |
| 7,414,988 B2 | 8/2008 | Jones et al. | |
| 7,509,215 B2 | 3/2009 | Shen et al. | |
| 7,519,376 B2 * | 4/2009 | Chang | 455/456.3 |
| 8,041,555 B2 | 10/2011 | Buccella | |
| 8,165,599 B1 | 4/2012 | Dronamraju et al. | |
| 8,468,154 B2 | 6/2013 | Leino et al. | |
| 2002/0163907 A1 | 11/2002 | Odenwalder et al. | |
| 2003/0100316 A1 | 5/2003 | Odamura | |

(Continued)

FOREIGN PATENT DOCUMENTS

| CN | 1307683 A | 8/2001 |
|---|---|---|
| CN | 1413424 A | 4/2003 |

(Continued)

OTHER PUBLICATIONS

Doyle, et al: "Evaluating the benefits of multimodal interface design for CoMPASS—a mobile GIS" Geoinformatica, An International Journal on Advances of Computer Science for Geographic Information Systems, Kluwer Academic Publishers, BO, vol. 14, No. 2, Mar. 10, 2009, pp. 135-162, XP019789295, abstract, sections 1-3.

(Continued)

*Primary Examiner* — Paul Danneman (57) ABSTRACT

Methods and apparatuses are provided that may be implemented in various electronic devices to allow for location, navigation, and/or other like information and/or services to be provided to a user based, at least in part, on audio input information corresponding one or more environmental features which are near by the user of the portable electronic device.

37 Claims, 4 Drawing Sheets

(56) References Cited

U.S. PATENT DOCUMENTS

| | | | |
|---|---|---|---|
| 2003/0176965 A1 | 9/2003 | Padmanabhan | |
| 2003/0234807 A1 | 12/2003 | Onbe et al. | |
| 2004/0176906 A1* | 9/2004 | Matsubara et al. | 701/200 |
| 2004/0203880 A1 | 10/2004 | Riley | |
| 2004/0203931 A1 | 10/2004 | Karaoguz | |
| 2004/0224703 A1 | 11/2004 | Takaki et al. | |
| 2004/0249983 A1 | 12/2004 | Bedner | |
| 2005/0059439 A1 | 3/2005 | White et al. | |
| 2005/0117750 A1 | 6/2005 | Rekimoto | |
| 2005/0192024 A1 | 9/2005 | Sheynblat | |
| 2005/0265321 A1 | 12/2005 | Rappaport et al. | |
| 2006/0022048 A1 | 2/2006 | Johnson | |
| 2006/0046709 A1 | 3/2006 | Krumm et al. | |
| 2006/0171588 A1 | 8/2006 | Chellapilla et al. | |
| 2006/0204098 A1* | 9/2006 | Gaast | 382/182 |
| 2006/0215736 A1 | 9/2006 | Rasmussen | |
| 2007/0001904 A1 | 1/2007 | Mendelson | |
| 2007/0025456 A1 | 2/2007 | McCrady | |
| 2007/0026847 A1 | 2/2007 | Polk et al. | |
| 2007/0037558 A1 | 2/2007 | Yu et al. | |
| 2007/0140595 A1 | 6/2007 | Taylor et al. | |
| 2007/0270122 A1* | 11/2007 | Ewell, Jr. | 455/404.2 |
| 2008/0032706 A1 | 2/2008 | Sheynblat et al. | |
| 2008/0039120 A1 | 2/2008 | Gad | |
| 2008/0101277 A1 | 5/2008 | Taylor et al. | |
| 2009/0003332 A1 | 1/2009 | Flanagan et al. | |
| 2009/0037099 A1 | 2/2009 | Joshi | |
| 2009/0040370 A1 | 2/2009 | Varanasi | |
| 2009/0201208 A1 | 8/2009 | McPherson et al. | |
| 2009/0204319 A1 | 8/2009 | Shanbhag et al. | |
| 2009/0319166 A1* | 12/2009 | Khosravy et al. | 701/200 |
| 2010/0063889 A1 | 3/2010 | Proctor, Jr. et al. | |
| 2010/0128131 A1 | 5/2010 | Tenchio et al. | |
| 2010/0135178 A1 | 6/2010 | Aggarwal et al. | |
| 2010/0157848 A1 | 6/2010 | Das et al. | |
| 2010/0172259 A1 | 7/2010 | Aggarwal et al. | |
| 2010/0304755 A1 | 12/2010 | Rice et al. | |
| 2011/0045840 A1 | 2/2011 | Alizadeh-Shabdiz et al. | |
| 2011/0080848 A1 | 4/2011 | Khorashadi et al. | |
| 2011/0081084 A1 | 4/2011 | Takahashi et al. | |
| 2011/0081919 A1 | 4/2011 | Das et al. | |
| 2011/0183626 A1 | 7/2011 | Das et al. | |
| 2011/0190004 A1 | 8/2011 | Tenny et al. | |
| 2011/0201350 A1 | 8/2011 | Das et al. | |
| 2012/0130632 A1 | 5/2012 | Bandyopadhyay et al. | |
| 2012/0289249 A1 | 11/2012 | Bhattacharya et al. | |
| 2012/0293371 A1 | 11/2012 | Lu | |
| 2013/0109413 A1 | 5/2013 | Das et al. | |
| 2013/0122941 A1 | 5/2013 | Das et al. | |
| 2013/0230208 A1 | 9/2013 | Gupta et al. | |

FOREIGN PATENT DOCUMENTS

| | | | | |
|---|---|---|---|---|
| CN | 1448856 | A | 10/2003 | |
| CN | 1832513 | A | 9/2006 | |
| CN | 101162151 | A | 4/2008 | |
| CN | 101162153 | A | 4/2008 | |
| EP | 1197111 | A1 | 4/2002 | |
| EP | 1258851 | A2 | 11/2002 | |
| EP | 1701524 | A1 | 9/2006 | |
| JP | 10285640 | A | 10/1998 | |
| JP | H11225365 | A | 8/1999 | |
| JP | 2001045549 | A | 2/2001 | |
| JP | 2001508250 | A | 6/2001 | |
| JP | 2001336941 | A | 12/2001 | |
| JP | 2002132771 | A | 5/2002 | |
| JP | 2002152802 | A | 5/2002 | |
| JP | 2002230673 | A | 8/2002 | |
| JP | 2003035555 | A | 2/2003 | |
| JP | 2003162217 | A | 6/2003 | |
| JP | 2003518625 | A | 6/2003 | |
| JP | 2003244747 | A | 8/2003 | |
| JP | 2003295889 | A | 10/2003 | |
| JP | 2004072546 | A | 3/2004 | |
| JP | 2005039702 | A | 2/2005 | |
| JP | 2005051490 | A | 2/2005 | |
| JP | 2005136897 | A | 5/2005 | |
| JP | 2006010687 | A | 1/2006 | |
| JP | 2006090868 | A | 4/2006 | |
| JP | 2007178279 | A | 7/2007 | |
| JP | 2007221479 | A | 8/2007 | |
| JP | 2007322906 | A | 12/2007 | |
| JP | 2008033043 | A | 2/2008 | |
| JP | 2008507167 | A | 3/2008 | |
| JP | 2008206126 | A | 9/2008 | |
| JP | 2008539672 | A | 11/2008 | |
| WO | WO0149056 | | 7/2001 | |
| WO | WO2004102991 | A2 | 11/2004 | |
| WO | WO 2004104520 | A1 * | 12/2004 | G01C 21/36 |
| WO | 2006005790 | A1 | 1/2006 | |
| WO | 2006116449 | A2 | 11/2006 | |
| WO | WO2007082534 | A1 | 7/2007 | |
| WO | WO 2007082534 | A1 * | 7/2007 | |
| WO | 2011095227 | A1 | 8/2011 | |

OTHER PUBLICATIONS

International Search Report/Writen Opinion—PCT/US2010/027180—International Search Authority EPO—Jun. 14, 2010.

"802.11 Broadcast of Local Info", Submitted by Brad Templeton, Mar. 18, 2005, Brad Ideas: Crazy Ideas, Inventions, Essays and Links from Brad Templeton, http://ideas.4brad.com/archives/000188.html.

Smith, "Tesseract OCR Engine, What it is, where it came from," Google Inc, OSCON 2007.

Eissele, M., et al., "Mobile Navigation and Augmentation utilizing Real-World Text", TZI Bericht Nr 44, Sep. 3, 2007, pp. 9-18, XP055059961, Retrieved from the Internet: URL:http://www.tzi.de/fileadmin/resources/publikationen/tzi_berichte/TZI-Bericht-Nr.02.pdf#page=11 [retrieved on Apr. 17, 2013] section 3.

Sanpechuda T. et al., "A review of RFID localization: Applications and techniques", 5th International Conference on Electrical Engineering/Electronics, Computer, Telecommunications and Information Technology (ECTI-CON), May 2008, pp. 769-772, vol. 2, IEEE.

Zaruba G. V., et al., "Indoor location tracking using RSSI readings from a single Wi-Fi access point", Wireless networks, 2007, 221-235, vol. 13 No. 2, Springer-Verlag.

Polk J., et al., "RFC 3825: Dynamic Host Configuration Protocol Option for Coordinate-based Location Configuration Information", IETF Network Working Group, Jul. 2004, pp. 1-15.

* cited by examiner

HUMAN ASSISTED TECHNIQUES FOR PROVIDING LOCAL MAPS AND LOCATION-SPECIFIC ANNOTATED DATA

RELATED PATENT APPLICATIONS

This patent application claims priority to provisional U.S. Patent Application Ser. No. 61/160,208, filed Mar. 13, 2009, titled "Human Assisted Method For Providing Local Maps And Location-Specific Annotated Data", which is incorporated in its entirety by reference herein.

BACKGROUND

1. Field

The subject matter disclosed herein relates to electronic devices, and more particularly to methods and apparatuses for use in and/or with portable electronic devices and/or network-based devices capable of obtaining location and/or navigation information.

2. Information

Wireless communication systems are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity among a plethora of devices, both fixed and portable. Many of these wireless systems are coupled together through other communication systems and resources to promote even more communication and sharing of information.

Another popular and increasingly important wireless technology includes navigation systems and in particular satellite positioning systems (SPS) such as, for example, the global positioning system (GPS) and other like Global Navigation Satellite Systems (GNSS). SPS enabled devices, for example, may receive wireless SPS signals that are transmitted by orbiting satellites of a GNSS and/or other terrestrial based transmitting devices. The received SPS signals may, for example, be processed to estimate a location, altitude, and/or speed of the SPS enabled device.

Some devices and systems combine communication and navigation systems and services together. Thus, for example, a cellular phone device may also take advantage of location and navigation information and/or services. One increasingly popular service in this respect is to provide navigation information to a user through a portable electronic device operating in either a stand-alone mode or with assistance from other network-based devices. Here, for example, a user may be provided with map or other like directional information to help a user to navigate to a particular location (e.g., an address).

Unfortunately, there may be times when it is difficult to determine a location of a device with enough precision to provide useful location and/or navigation information. For example, there may be times when SPS signal reception is inadequate. Consequently, for this and other reasons it may be beneficial to employ techniques that allow for location, navigation, and/or other like information and/or services to be provided to a user under certain circumstances.

SUMMARY

In accordance with certain aspects, methods and apparatuses are provided for use with portable electronic devices to obtain sensory input information that corresponds to at least one visible environmental feature at or near by a location of the portable electronic device. The visible environmental feature may, for example, include human-readable information. Further, local map information may be obtained based, at least in part, on the sensory input information. Location and/or navigation information may also be obtained based, at least in part, on the local map information. For example, in certain implementations, a camera, microphone, satellite positioning system (SPS) receiver, and/or one or more sensors may be used to generate sensory input information.

In accordance with certain aspects, methods and apparatuses are provided for use with one or more network-based electronic devices to obtain sensory input information associated with a portable electronic device, wherein the sensory input information corresponds to at least one visible environmental feature at or near by a location of the portable electronic device. Here, for example, the visible environmental feature may include human-readable information. Local map information may be obtained based, at least in part, on the sensory input information and provided to the portable electronic device via a communication network.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

In accordance with certain aspects, techniques are described herein which may be implemented in one or more electronic device to allow for location, navigation, and/or other like information and/or services to be provided to a user based, at least in part, on sensory input information corresponding one or more visible environmental features which are near by the user of a portable electronic device. Thus, for example, a user of a device may input or initiate input of image and/or audio information relating to one or more visible environmental features at or near by their location, and location, navigation, and/or other like information and/or services may be provided based at least in part on such sensory input information.

By way of example, in accordance with certain implementations a portable electronic device may implement a method in which sensory input information is recorded using a camera and/or microphone. Thus, for example, still or video image information recorded by a camera as operated by a user may capture one or more visible environmental features that include human-readable information. Here, for example, a user may record an image or video of a sign of a nearby store, office building, office suite, street sign, and/or the like. A user may also or alternatively record audio information using a microphone. Thus, for example, a user may describe in some manner certain visible environmental features near by (e.g., adjacent, within sight, etc.). Here, for example, a user may read or otherwise describe a sign of a nearby store, office building, office suite, street sign, and/or the like.

A user may, for example, also or alternatively record certain directional and/or other like statements that may be useful in identifying such visible environmental features. Here, for example, a user may describe a spatial relationship of certain visible environmental features that may assist in estimating their current location. For example, a user may record audio information that includes a description of a first feature being located to their right hand side and a second feature being located to their left hand side. In certain implementations, image information may also or alternatively be used to record such spatial relationships. For example, a user may record an image(s) or video(s) (with or without such voice-based audio information).

Having obtained sensory input information, a portable electronic device may obtain local map information based, at least in part, on such sensory input information. As described in greater detail below, in certain example implementations a portable electronic device may be enabled to determine likely local map information based on its own pre-stored map information. In other example implementations, a portable electronic device may also or alternatively provide certain sensory input information to a network-based electronic device that may be enabled to determine likely local map information and/or provide such local map information or portion thereof to the portable electronic device. In certain example implementations, a local map may include a pictorial map of the venue. In certain example implementations, a local may include contextual information, such as, for example, a graphical digital description of the area, point of interest information possibly with geographical tags, information relating to certain radio beacon devices (e.g., access points), etc.

By way of example, in certain implementations a portable electronic device and/or network-based electronic device may be enabled to establish textual metadata based, at least in part, on recorded image information and/or recorded audio information. For example, recorded image information may be processed using one or more image recognition algorithms to identify human-readable information (e.g., content that is typically identifiable by humans as opposed to being intended as machine-readable content). Here, for example, an image recognition algorithm may be enabled to read alphanumeric text, and/or identify a specific iconic symbol as might appear in a sign. With regard to recorded audio information, in certain examples, such information may be processed using one or more voice recognition algorithms to identify human-readable information. Here, for example, a voice recognition algorithm may be enabled to identify one or more alphanumeric characters, words, and/or phrases that are either related to specific signs and/or spatial relationships associated with a user's location.

Those skilled in the art will recognize that various available image and/or voice recognition algorithms, processes, applications, tools, and/or other like services may be employed and/or otherwise be adapted for use in such electronic devices The specific implementation detail of such known exemplary image and/or voice algorithms is beyond the scope of this description and claimed subject matter and as such is not included herein, nor should such limit the scope of claimed subject matter.

All or part of the obtained sensory input information and/or corresponding textual metadata may, for example, be compared with and/or otherwise processed along with like type information and/or metadata in an existing map and location information database or other like repository to determine or otherwise identify likely local map information. Additionally, current or last known estimated location or other like navigation information associated with the portable electronic device may be taken into consideration to obtain likely local map information.

Having obtained likely local map information, a portable electronic device may obtain location and/or navigation information based, at least in part, on the local map information. As described in greater detail below, in certain example implementations a portable electronic device may be enabled to determine location and/or navigation information based on its own navigation application with access to the local map information. In other example implementations, a portable electronic device may also or alternatively receive certain location and/or navigation information as determined by a network-based electronic device with access to the local map information. In certain implementations, for example, a media access control (MAC) address and/or the like associated with one or more radio beacon devices may be included along with location and/or navigation information.

Having obtained location and/or navigation information, a portable electronic device may, for example, present such information to a user via one or more user interface mechanisms, such as, e.g., via a display and/or speaker. Here, for example, location and/or navigation information presented to the user may be based on user input(s) specifying in some manner a desired target location. For example, location and/or navigation information may provide a user with turn-by-turn directions, graphical route information, voice navigation, etc.

The exemplary techniques provided herein may, for example, be provided as part of a human-assisted location based service. Here, for example, the human-assistance may be in gathering and/or inputting of sensory input information corresponding to one or more visible environmental features. Such service may improve over time with information collected through use of the service, which may allow for improved (e.g., more accurate, useful) local maps and repository of location-specific annotated data in a database and/or the like.

In some embodiments, techniques provided herein may use various environmental information obtained via machine automated and/or human assistance for searching and matching to identify or otherwise obtain local maps and provide a most likely local map to a user, possibly along with location-specific annotations that may be of use in a navigation process.

Figure 1:
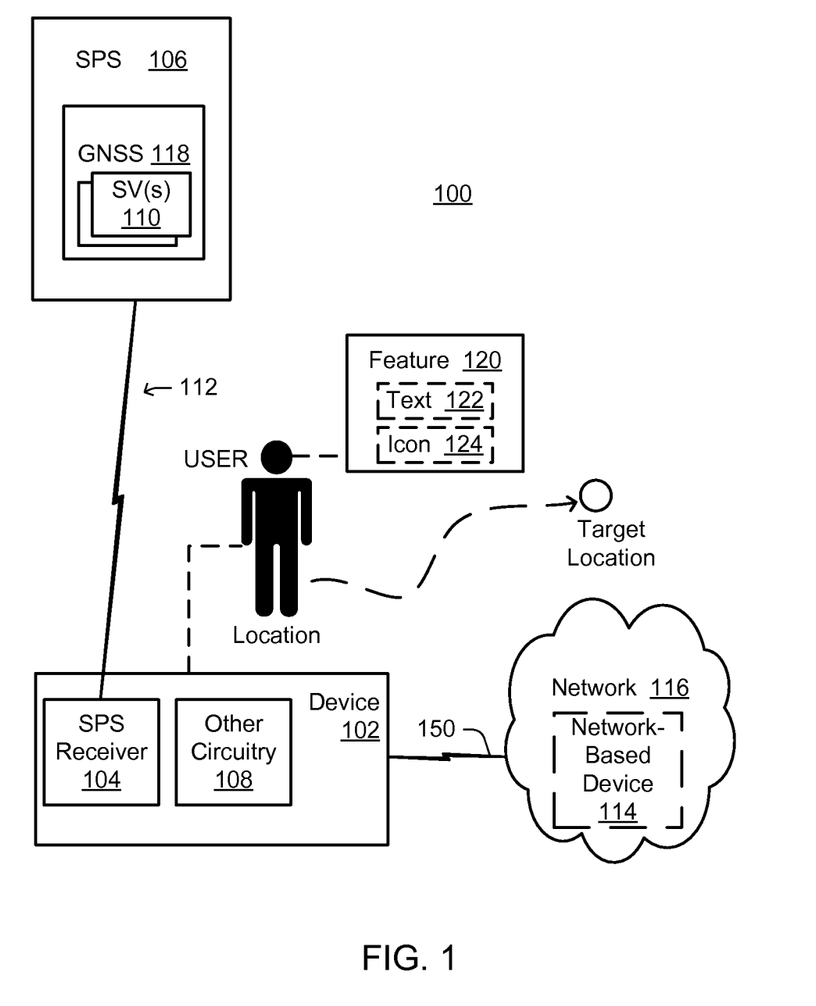
FIG. 1 is a schematic block diagram illustrating an exemplary environment that includes one or more electronic device to allow for location, navigation, and/or other like information and/or services to be provided to a user based, at least in part, on sensory input information corresponding one or more visible environmental features which are near by the user of a portable electronic device, in accordance with an implementation.

Reference is now made to FIG. 1, which is a schematic block diagram illustrating an exemplary environment 100 that includes at least one portable electronic device 102 capable of supporting, at least in part, location, navigation, and/or other like information and/or services for a user based, at least in part, on sensory input information corresponding one or more visible environmental features which are near by the user of a portable electronic device, in accordance with an example implementation. Here, for example, a user is illustrated as being at an estimated location at or near by a feature 120 and having the desire to travel to a target location with assistance from at least device 102.

Environment 100 may include various computing and communication resources capable of providing at least some form of a location, navigation, and/or other like information and/or services with regard to device 102 based, at least in part, on one or more SPS signals 112 from an SPS 106. Device 102 may include or otherwise be operatively coupled to at least one SPS receiver 104. As illustrated in the example shown in FIG. 1, device 102 may include other circuitry 106 and/or the like which enables device 102 to perform and/or support other processes. By way of example but not limitation, device 102 may be enabled to communicate with one or more resources within a communication network 116 over one or more wireless communication links 150. For example, one or more network-based electronic devices 114 may be provided within and/or coupled to network 116. Device 102 may include a mobile station (MS) such as a cellular phone, a smart phone, a personal digital assistant, a portable computing device, a navigation unit, and/or the like or any combination thereof, for example. In other example implementations, device 102 may take the form of one or more integrated circuits, circuit boards, and/or the like that may be operatively enabled for use in another device.

Device 102 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example.

As illustrated in the example in FIG. 1, SPS 106 may, for example, include one or more GNSS 108 or other like navigation systems which may include a different plurality of space vehicles (SVs) 110 that may transmit SPS signals 112.

Techniques described herein may be used with an "SPS" that includes any one of several navigation systems such as GNSS and/or combinations of GNSS, or other regional/local navigation systems. Furthermore, such techniques may be used with positioning systems that utilize pseudolites or a combination of space vehicles (SVs) and pseudolites. Pseudolites may, for example, include ground-based transmitters that broadcast a PN code or other ranging code (e.g., similar to a GPS or CDMA cellular signal). Such a transmitter may be assigned a unique PN code so as to permit identification by a remote receiver. Pseudolites may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include pseudolites, equivalents of pseudolites, and possibly others. The terms "SPS signals", as used herein, is intended to include SPS signals from pseudolites or equivalents of pseudolites.

As illustrated in FIG. 1, by way of example but not limitation, feature 120 may, include and/or otherwise be identifiable by a human and conveying certain human-readable information via some form of alphanumeric and/or other like text 122, and/or via some graphical icon 124 form (e.g., symbolic, graphical, visual, etc.).

Figure 2:
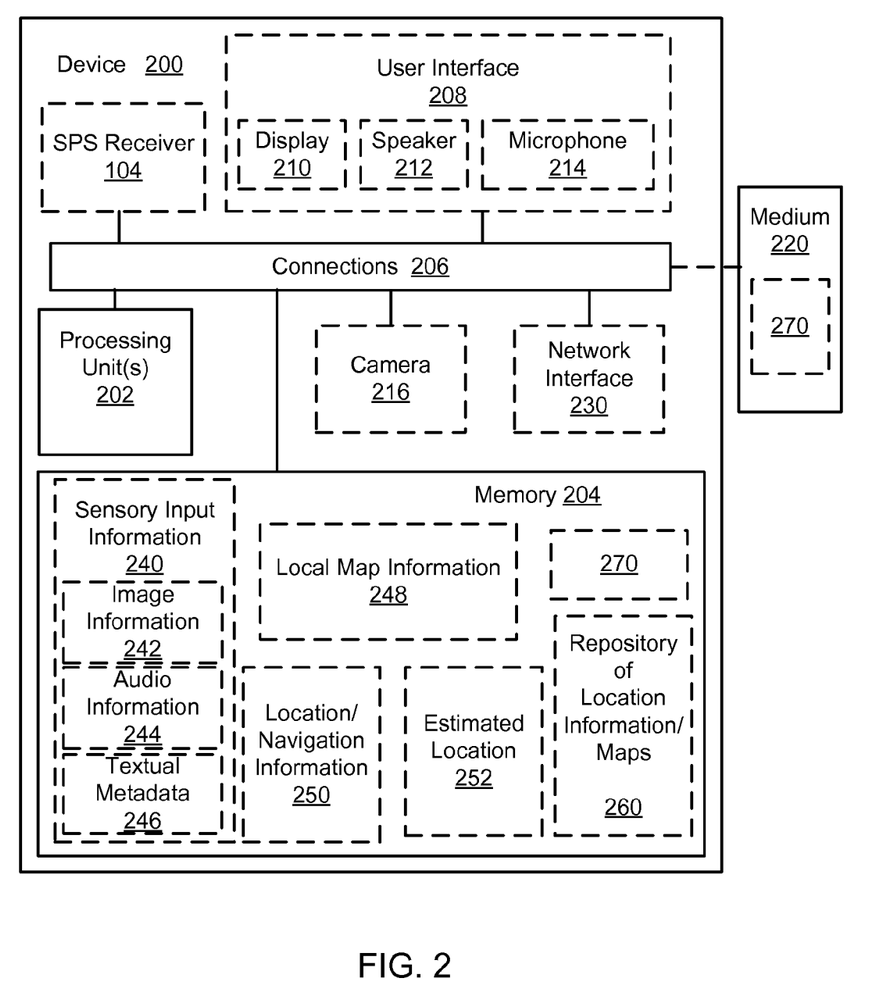
FIG. 2 is a schematic block diagram illustrating certain features of an exemplary computing/electronic device, for example as in FIG. 1, in accordance with an implementation.

Reference is made next to FIG. 2 which shows a schematic block diagram of an example computing device 200. Computing device 200 may be representative of an example portable electronic device 102. Computing device 200 may be representative of an example network-based electronic device 114.

As illustrated in the exemplary schematic block diagram of FIG. 2, in certain example implementations, device 200 may include an SPS receiver 104 capable of receiving an RF signal that includes at least one SPS signal 112. SPS receiver 104 may include, for example, an RF front-end circuit coupled to a back-end processor (processing unit) (not shown). Here, for example, SPS receiver 104 may determine an estimated location 252 of device 200, which may be stored in memory 204.

Various forms/types of information may be stored in memory 204. By way of example but not limitation, as illustrated in FIG. 2, memory 204 may store sensory input information 240, recorded image information 242, recorded audio information 244, textual metadata 250, local map information 248, location and/or navigation information 250, estimated location 252, a repository of location information and/or maps 260, and/or any combination thereof or the like. Memory 204 may have stored therein various other data and computer implementable instructions 270. Such instructions may be executed, for example, by one or more processing units or processors 202.

As mentioned, in certain example implementations, one or more of the circuits illustrated within device 102 may be operatively responsive to, or otherwise affected in some manner by, computer implementable instructions 270, which are stored in memory 204. Thus, for example, at least a portion of the computer implementable instructions 270 may be implemented by processing unit(s) 202, and/or other programmable circuitry associated with a user interface 208, a display 210, a speaker 212, a microphone 214, a camera 216, SPS receiver 104, a network interface 230, etc., to provide or otherwise operatively support in some manner the techniques described herein.

As illustrated in FIG. 2 an article of manufacture represented here by a computer readable medium 220 may be provided and accessed by processing unit(s) 202, for example. As such, in certain example implementations, the methods and/or apparatuses may take the form in whole or part of a computer readable medium 220 that includes computer implementable instructions 270 stored thereon, which if executed by at least one processing unit or other like circuitry enable the processing unit(s) 202 and/or the other like circuitry to perform all or portions of the techniques/processes as presented in the examples herein. Computer readable medium 220 may be representative of any data storage mechanism.

Processing unit(s) 202 may be implemented in hardware or a combination of hardware and software. Processing unit(s) 202 may be representative of one or more circuits configurable to perform at least a portion of a data computing procedure or process. By way of example but not limitation, processing unit(s) 202 may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory and/or a secondary memory. Primary memory may include, for example, a random access memory, read only memory, etc. While illustrated in this example as being separate from processing unit(s) 202, it should be understood that at least a portion of a primary memory may be provided within or otherwise co-located/coupled with processing unit(s) 202, SPS receiver 104, camera 216, user interface 208, etc. Secondary memory may include, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 220.

As further illustrated in FIG. 2, device 200 may include one or more connections 206 (e.g., buses, lines, conductors, fibers, etc.) to operatively couple the various circuits together and carry one or more electronic signals there between, and a user interface 208. User interface 208 may be representative of various user input and/or output mechanisms/devices. For example, as shown user interface 208 may include a display 210 and speaker 212 to provide user output. In some examples, as shown, user interface 208 may at least one microphone to provide user input. Other user input (not shown) may include, for example, a touch screen, a keypad, one or more buttons, one or more knobs, etc. As also shown here, device 200 may include at least one camera 216. Camera 216 may, for example, be representative of a digital camera that records still and/or video image information 242. Camera 216 may include monochromatic and/or color images. The format of image information 242 and/or audio information 244 may vary by design and may include raw data and/or compressed data. In certain implementations, microphone 214 may provide audio information 244 that corresponds to image information 242. In certain other instances, audio information 244 and image information 242 may be unrelated.

Figure 3:
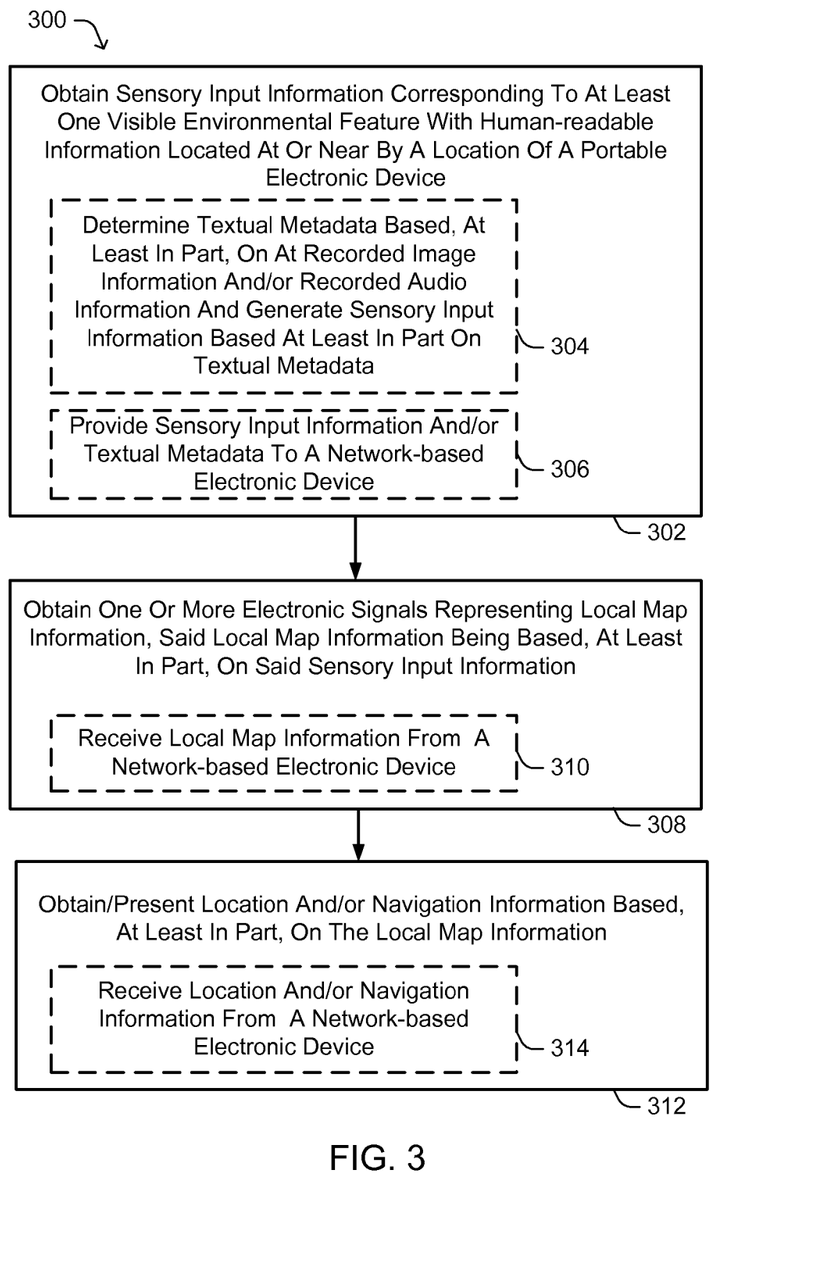
FIG. 3 is a flow diagram illustrating an example process that may be implemented in a portable electronic device to allow for location, navigation, and/or other like information and/or services to be provided to a user based, at least in part, on sensory input information corresponding one or more visible environmental features which are near by the user of the portable electronic device, in accordance with an implementation.

Reference is made next to FIG. 3, which is a flow diagram illustrating an example process 300 that may be implemented in whole or part in a portable electronic device 102 (FIG. 1) and/or computing device 200 (FIG. 2), in accordance with an implementation.

At block 302, one or more electronic signals representing sensory input information may be obtained. The sensory input information may correspond to at least one visible environmental feature that is located at or near by a portable electronic device and which includes at least one visible environmental feature comprising human-readable information. In certain example implementations, at block 304 in block 302, textual metadata may be determined based, at least in part, on at least one of recorded image information and/or recorded audio information. In certain example implementations, at block 306 in block 302, all or portions of the sensory input information and/or the textual metadata may be provided to a network-based electronic device. In certain example implementations, a digital compass (e.g., magnetometer) and/or accelerometer may also provide sensory input information that may be provided in metadata. For example, as a user captures images (e.g., from left to right) such movement may be recorded by such type(s) of sensors and audio, image, and/or video information may be tagged or otherwise associated with such sensory input information.

At block 308, one or more electronic signals representing local map information may be obtained. Here, for example, the local map information may be based, at least in part, on at least a portion of the sensory input information and/or the textual metadata (if available). In certain example implementations, at block 310 in block 308, all or part of the local map information may be received from a network-based electronic device. In certain implementations, the local map information may be based, at least in part, on estimated location information associated with portable electronic device.

At block 312, one or more electronic signals representing location and/or navigation information may be obtained. All or part of the location/navigation information may be based, at least in part, on the local map information. In certain example implementations, at block 314 in block 312, all or part of the location/navigation information may be received from a network-based electronic device. In certain implementations, at block 312, all or part of the location/navigation information may be presented in some manner to a user.

Figure 4:
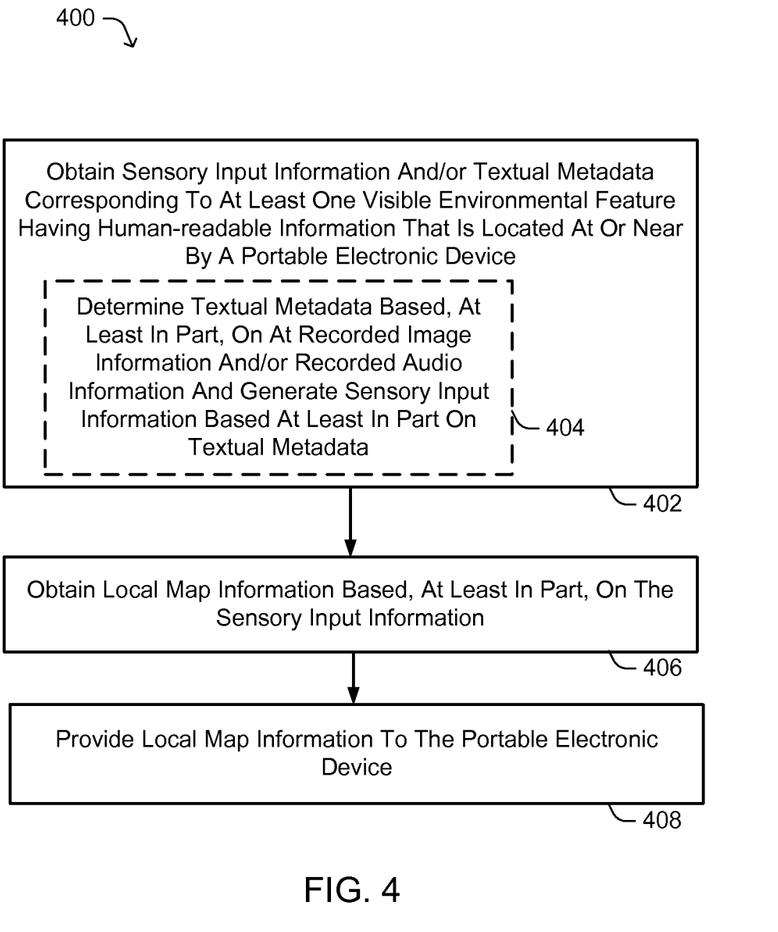
FIG. 4 is a flow diagram illustrating an example process that may be implemented in one or more network-based electronic devices to allow for location, navigation, and/or other like information and/or services to be provided to a user based, at least in part, on sensory input information corresponding one or more visible environmental features which are near by the user of a portable electronic device, in accordance with an implementation.

Reference is made next to FIG. 4, which is a flow diagram illustrating an example process 400 that may be implemented in whole or part in one or more network-based electronic device(s) 114 (FIG. 1) and/or computing device(s) 200 (FIG. 2), in accordance with an implementation.

At block 402, sensory input information and/or textual metadata associated with a portable electronic device may be obtained. For example, all or part of the sensory input information and/or textual metadata may be received via a network interface from portable electronic device. Here, the sensory input information may correspond to at least one visible environmental feature that is located at or near by a location of the portable electronic device and which may include at least one visible environmental feature comprising human-readable information. In certain example implementations, at block 404 in block 402, the textual metadata may be determined based, at least in part, on at least one of recorded image information and/or recorded audio information.

At block 406, local map information may be obtained, for example, based, at least in part, on the sensory input information and/or textual metadata. Here, for example, at least a portion of the sensory input information and/or textual metadata may be compared to and/or otherwise processed based on similar or related types/values of information in one or more repositories of location information and/or maps. Here, for example, one or more map and/or location databases may be searched to identify and/or otherwise generate (likely) local map information. In certain example implementations, a likelihood of a local map based on input metadata may be based on one or more functions. For example, in certain instances an adjacency graph representation of the local area may be established with nodes representing one or more points of interest and/or edges representing adjacency among the points of interest as well as a direction indicated. For example, a first node and a second node may have an edge with the direction of the edge possibly indicating an order of a relationship and as such one or more annotations may be included with information about such or other like relative placement/arrangement. Thus, an edge annotation may indicate LEFT OF IF FACING NORTH and RIGHT OF IF FACING SOUTH, which may, for example, reflect that a first node is TO THE LEFT OF a second node IF the user is facing NORTH.

At block 408, all or part of the local map information may be provided to the portable electronic device.

Those skilled in the art will recognize that such operative substitutions and/or applicable conversions may take on various forms depending on the specific systems and information involved.

With this in mind, some further non-limiting example implementations and aspects will now be presented to further illustrate some of the potential uses and/or benefits of the techniques described herein.

The techniques herein may, for example, be implemented to provide a mechanism for provisioning an initial map using human assistance in the form of providing sensory input information. With the provisioning of this initial map, a relative location may be given with reference to the map and, and in certain implementations, if such map is annotated with global coordinates the relative position may be transformed into a position within a global coordinate system.

In an illustrative example, assume that a user with a mobile station enters an indoor location and wishes to retrieve an indoor local map to enable various location based services such as navigation, obtaining beacon address-location mappings, shopping etc. The non-availability of a precise enough estimated location in such a situation may preclude a use of last known good position from GPS or Assisted-GPS from determining a correct local map for use. Here, for example, a local map may include information that may be very specific to a level or portion of a specific part of a specific floor in a building.

In certain example implementations, the techniques provided herein may be implemented to allow the mobile station to obtain a local map, either on its own or with assistance from one or more network-based electronic devices.

Here, for example, a mobile station may obtain sensory input information with "human assistance" from the user. The human assistance may, for example, include voice based audio information input wherein the user may vocalize certain environmental features at or nearby their current location. By way of example but not limitation, features such as names of shops, room numbers, names of people on room doors, etc., may be described and/or read. Thus, in this example, the user may record audio information that may be used to generate textual metadata associated with their current environment. In certain implementations, audio information may include an auditory environmental recording in which a user may capture certain identifiable sounds in their surroundings. In certain implementations, still and/or video image information may be captured using a camera to record image information that may be used to textual metadata associated with their current environment. Here, for example, a user may take pictures of their surroundings, and/or move their mobile station as needed to capture a video of their environment.

In certain example implementations, a collection of environmental information may be structured for more precise matching in map database. For example, such information structure may include separating an environment into sectors (e.g., covering certain angles relative to the user's position and a reference line), and obtaining sensory input in a specific sequence related to all or part of the sectors. For example, sectors may correspond to ninety degree angles and a specific sequence may be followed by the user (e.g., counter clockwise rotation) to record sensory input information for each sector. This type of coordinated capture may allow for certain spatial relationship information to be established and possibly added to a repository of location information/maps.

In certain implementations, all or part of the sensory input information may be the used or transformed in some manner to obtain metadata such as text or other signatures (referred to herein simply as "textual information"). By way of example, well known techniques such as automatic speech recognition (ASR) and/or optical character recognition on images may be employed. In certain implementations, audio information may be converted to a signature. In certain implementations, video information may be transformed into a set of still images.

In certain example implementations, "as-is sensory input" (e.g., recorded image information and/or audio information) may be provided to one or more network-based electronic devices enabled to provide a search module. Here, for example, images and videos may be submitted as-is to a search module and the search module may use matching in an image database to directly compare images of location that a user is in with those annotated with a local map. Similarly, a search module may do a similar comparison for audio information and/or corresponding metadata.

Textual metadata may, for example, be used in searching a local or remote repository of location information/maps which are annotated in some manner with metadata. For example, in certain implementations textual metadata obtained from a mobile station may be used to search through metadata associated with local maps to find a list of local maps most likely to be the one relating to the user's location (e.g., on the basis of maximum metadata matching). Here, for example, if a local map exists with annotations for certain text and/or iconic information in a particular spatial relationship, the matching local map information may be given a high probability of being the correct one. Such search may, for example, be performed in whole or part on either the mobile station and/or network-based electronic device (e.g., a remote server, etc.).

In certain example implementations, to reduce the search space or otherwise improve performance, a previously estimated location of the mobile station may be used to reduce, limit or otherwise focus the set of local maps searched for matches with the textual metadata.

In certain implementations, additional and/or specific sensory input information may be requested of a user. For example, a user may be prompted (e.g., via a user interface mechanism) for additional specific input that may assist a search/matching process. For example, a user may be asked which floor of a building they are on. In certain implementations, a user may be provided with one or more potential local maps (e.g., relating to their last estimated location) from which to choose an applicable local map for use.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating,", "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising:
    with a portable electronic device:
        obtaining one or more electronic signals representing audio input information, wherein the audio input information corresponds to at least one environmental feature at or near by a location of said portable electronic device and includes an ambient auditory environmental recording in which a user captures sounds in their surrounding environment;
        obtaining one or more electronic signals representing local map information, said local map information being based, at least in part, on said audio input information;
        obtaining one or more electronic signals representing location and/or navigation information based, at least in part, on said local map information and said audio input information; and
        determining a current position of the portable electronic device based on the one or more electronic signals representing location and/or navigation information.

2. The method as recited in claim 1, further comprising, with the portable electronic device, obtaining image input information from a camera in the portable electronic device, wherein the image input information corresponds to the at least one environmental feature.

3. The method as recited in claim 1, wherein said audio input information comprises recorded audio information, and wherein obtaining said one or more electronic signals representing said audio input information further comprises:
    determining textual metadata based, at least in part, on said recorded audio information; and
    generating said one or more electronic signals representing said audio input information based at least in part on said textual metadata.

4. The method as recited in claim 3, wherein generating said one or more electronic signals representing said audio input information based at least in part on said textual metadata comprises
    transmitting one or more electronic signals representing at least a portion of said textual metadata via a communication network; and
    receiving at least a portion of said one or more electronic signals representing said audio input information based at least in part on said textual metadata via said communication network.

5. The method as recited in claim 1, wherein obtaining said one or more electronic signals representing said audio input information comprises:
    transmitting one or more electronic signals representing at least one of recorded audio information via a communication network; and
    receiving at least a portion of said one or more electronic signals representing said local map information via said communication network.

6. The method as recited in claim 1, wherein obtaining said one or more electronic signals representing said local map information comprises receiving at least a portion of said one or more electronic signals representing said local map information via a communication network.

7. The method as recited in claim 1, wherein obtaining said one or more electronic signals representing said location and/or navigation information comprises receiving at least a portion of said one or more electronic signals representing said location and/or navigation information via a communication network.

8. The method as recited in claim 1, wherein obtaining said one or more electronic signals representing local map information comprises:
obtaining said one or more electronic signals representing local map information based, at least in part, on estimated location information associated with said portable electronic device.

9. The article of claim 1, wherein the audio input information includes a human voice based audio information.

10. An apparatus comprising:
means for obtaining audio input information, wherein the audio input information corresponds to at least one environmental feature at or near by a location of said portable electronic device and includes an ambient auditory environmental recording in which a user captures sounds in their surrounding environment;
means for obtaining local map information, said local map information being based, at least in part, on said audio input information;
means for obtaining location and/or navigation information based, at least in part, on said local map information and on said audio input information; and
means for determining a current position of the portable electronic device based on the obtained location and/or navigation information.

11. The apparatus as recited in claim 10, further comprising:
means for recording image information corresponding to the at least one environmental feature.

12. The apparatus as recited in claim 10, further comprising:
means for determining textual metadata based, at least in part, on recorded audio information; and
means for generating said audio input information based at least in part on said textual metadata.

13. The apparatus as recited in claim 12, further comprising:
means for transmitting at least a portion of said textual metadata via a communication network; and
means for receiving at least a portion of said audio input information based at least in part on said textual metadata via said communication network.

14. The apparatus as recited in claim 10, further comprising:
means for transmitting at least the audio input information via a communication network; and
means for receiving at least a portion of said local map information via said communication network.

15. The apparatus as recited in claim 10, further comprising:
means for receiving at least a portion of said local map information via a communication network.

16. The apparatus as recited in claim 10, further comprising:
means for receiving at least a portion of said location and/or navigation information via a communication network.

17. The article of claim 10, wherein the audio input information includes a human voice based audio information.

18. A portable electronic device comprising:
memory;
at least one user interface mechanism coupled to said memory; and
at least one processing unit coupled to said memory and said user interface mechanism and programmed with instructions to:
obtain audio input information corresponding to at least one environmental feature at or near by a location of said portable electronic device and including an ambient auditory environmental recording in which a user captures sounds in their surrounding environment;
obtain local map information, said local map information being based, at least in part, on said audio input information;
obtain location and/or navigation information based, at least in part, on said local map information and on said audio input information; and
initiate presentation of a current position of the portable electronic device based on at least a portion of said location and/or navigation information, wherein the current position of the portable device is presented via said user interface mechanism.

19. The portable electronic device as recited in claim 18, further comprising:
a camera coupled to at least one of said memory and/or said at least one processing unit, said at least one processing unit being further programmed with said instructions to initiate said camera to record image information corresponding to the at least one environmental feature.

20. The portable electronic device as recited in claim 18, wherein said audio input information comprises recorded audio information, and wherein said at least one processing unit being further programmed with said instructions to:
determine textual metadata based, at least in part, on said recorded audio information; and
generate said audio input information based at least in part on said textual metadata.

21. The portable electronic device as recited in claim 20, further comprising:
a network interface coupled to at least one of said memory and/or said at least one processing unit;
wherein said at least one processing unit is further programmed with said instructions to initiate said network interface to transmit at least a portion of said textual metadata via a communication network; and
wherein said network interface receives at least a portion of said audio input information based at least in part on said textual metadata via said communication network.

22. The portable electronic device as recited in claim 18, further comprising:
a network interface coupled to at least one of said memory and/or said at least one processing unit;
wherein said at least one processing unit is further programmed with said instructions to initiate said network interface to transmit the audio input information via a communication network; and
wherein said network interface receives at least a portion of said local map information via said communication network.

23. The portable electronic device as recited in claim 18, further comprising:

a network interface coupled to at least one of said memory and/or said at least one processing unit, said network interface to receive at least a portion of said local map information via a communication network.

24. The portable electronic device as recited in claim 18, further comprising:
a network interface coupled to at least one of said memory and/or said at least one processing unit, said network interface to receive at least a portion of said location and/or navigation information via a communication network.

25. The portable electronic device as recited in claim 18, wherein said portable electronic device comprises a mobile station.

26. The article of claim 18, wherein the audio input information includes a human voice based audio information.

27. An article comprising:
a computer readable medium having computer implementable instructions stored thereon that in response to being executed by one or more processing units in a portable electronic device enable the electronic device to:
obtain audio input information corresponding to at least one environmental feature at or near by a location of said portable electronic device and including an ambient auditory environmental recording in which a user captures sounds in their surrounding environment;
obtain local map information, said local map information being based, at least in part, on said audio input information;
obtain location and/or navigation information based, at least in part, on said local map information; and
determine a current position of the portable device based on the one or more electronic signals representing location and/or navigation information.

28. The article as recited in claim 27, wherein the computer implementable instructions in response to being executed by the one or more processing units in the portable electronic device further enable the portable electronic device to record image information corresponding to the at least one environmental feature.

29. The article as recited in claim 27, wherein the computer implementable instructions in response to being executed by the one or more processing units in the portable electronic device further enable the portable electronic device to:
determine textual metadata based, at least in part, on recorded audio information; and
generate said audio input information based at least in part on said textual metadata.

30. The article as recited in claim 29, wherein the computer implementable instructions in response to being executed by the one or more processing units in the portable electronic device further enable the portable electronic device to:
initiate transmission of at least a portion of said textual metadata via a communication network; and
access at least a portion of said audio input information based at least in part on said textual metadata obtained via said communication network.

31. The article as recited in claim 27, wherein the computer implementable instructions in response to being executed by the one or more processing units in the portable electronic device further enable the portable electronic device to:
initiate transmission of recorded audio information via a communication network; and
access at least a portion of said local map information obtained via said communication network.

32. The article as recited in claim 27, wherein the computer implementable instructions in response to being executed by the one or more processing units in the portable electronic device further enable the portable electronic device to:
access at least a portion of said local map information obtained via a communication network.

33. The article as recited in claim 27, wherein the computer implementable instructions in response to being executed by the one or more processing units in the portable electronic device further enable the portable electronic device to:
access at least a portion of said location and/or navigation information obtained via a communication network.

34. The article as recited in claim 27, wherein the computer implementable instructions in response to being executed by the one or more processing units in the portable electronic device further enable the portable electronic device to:
initiate presentation of the current position of the portable electronic device based on at least a portion of said location and/or navigation information, wherein the current position of the portable device is presented via at least one user interface mechanism.

35. The article of claim 27, wherein the audio input information includes a human voice based audio information.

36. A method for displaying the position of a portable electronic device, comprising:
receiving audio input information with the portable electronic device, wherein the audio input information corresponds to at least one environmental feature adjacent to the portable electronic device and includes an ambient auditory environmental recording in which a user captures sounds in their surrounding environment;
provisioning an initial map based on the audio input information;
providing a relative position of the portable electronic device in reference to the initial map based on the audio input information;
transforming the relative position into a position within a global coordinate system; and
displaying the position of the portable electronic device.

37. The method of claim 36 wherein the audio input information includes a human voice based audio information.

* * * * *